3,181,235
PROCESS FOR RESISTANCE WELDING THROUGH
A BUTYL RUBBER WELD-THROUGH SEALANT
Lyle Wallis, Baltimore, and James O. Mathis, Sykesville,
Md., assignors to Martin-Marietta Corporation, New
York, N.Y., a corporation of Maryland
No Drawing. Filed Jan. 15, 1963, Ser. No. 251,485
7 Claims. (Cl. 29—484)

This invention relates to weld-through sealant techniques and, more particularly, to a process whereby resistance welds may be more effectively sealed from attack by highly reactive agents and whereby higher quality welds may be produced through weld-through sealants than heretofore possible.

The high temperatures associated with resistance welding produces a heat affected area in the immediate vicinity of the weld nugget which is characterized by certain alloying constituents being driven out of the solid solution of the base metals. This situation in effect results in the creation of small local galvanic cells throughout the heat affected area of the weld which is consequently highly susceptible to attack by reactive agents. It continues to be the responsibility of technically trained personnel to devise methods whereby such welds and their associated heat affected zones may be effectively protected from attack by reactive agents.

In this respect others have devised welding techniques utilizing various types of weld-through sealants. Such sealants have been developed which may be conveniently applied to the faying surfaces of the materials to be welded, which do not interfere with the welding operation nor substantially increase the welding current requirements and which, after welding, completely seal the weld and its associated heat affected zone. While these prior art techniques and sealants have proved satisfactory for many applications, limitations inherently associated therewith prevent their use in the more critical situations.

None of the commercially available weld-through sealants are capable of withstanding attack from the more highly reactive types of agents for any significant length of time and, consequently, are not compatible for use with such materials. For example, one of the more commonly employed rocket propellants is formed by the mixing of nitrogen tetroxide with Aerozine 50 (50–50 mixture of unsymmetrical DiMethyl Hydrazine and Hydrazine) produced by the Aerojet General Corporation of Azusa, California. The former of these constituents in the presence of water has a very strong corroding effect on materials such as aluminum, while in the presence of water the latter of these constituents has a very strong alkalizing affect on such materials. No commercially available weld-through sealant has proved successful in withstanding the attacks of these highly reactive agents. Attempts to seal resistance welds from such attacks after the weld has been formed have proved to be equally unsuccessful for a number of reasons. First, if a compatible organic sealant, such as silicone rubber, is applied along the outer edges of the seams formed between two details and should fail to seal at any point, the reactive agent can enter between the faying surfaces through the crack in the sealant and become entrapped thereby aggravating the situation since the reactive agent has less chance of draining out than if no sealant had been employed in the first instance. Secondly, design configurations frequently prevent the application of such sealants after a weld has been formed and, thirdly, organic sealants applied as beads along the seams expose such large areas to any reactive agent that deterioration of the sealant is often accelerated to a prohibitive extent. Because of these problems associated with the application of compatible sealants after the weld has been formed, it is often more desirable or even necessary to forego the use of any sealant and to accept an unsealed welded structure recognizing that it will have a short life expectancy.

Today's Space Age necessarily requires the utilization of advanced manufacturing techniques to produce unusually reliable structures and equipments and, in many instances, has placed requirements on industry in respect to manufacturing techniques which have not as yet even been developed. Analogous to this situation is the fact that, while the use of weld-through sealants is frequently necessary in order to adequately protect resistance welds from reactive agents, prior to the present invention it had been impossible using any heretofore proposed weld-through sealant to consistently produce Class A welds in accordance with Military Specification MIL–W–6858B, dated November 2, 1960, entitled "Welding, Resistance; Aluminum, Magnesium, Non-Hardening Steels or Alloys, Nickel Alloys, Heat-Resistant Alloys, and Titanium Alloys; Spot and Seam."

Any weld-through sealant must necessarily be capable of permitting an electrical circuit to be completed between the electrodes of the welding apparatus. In order to accomplish this result it therefore has been the common practice to include at least one ingredient, such as aluminum flakes, in prior art weld-through sealants which has a high electrical conductivity characteristic. This situation results in a sealant which, after welding, is a relatively good conductor of electricity. Since the necessary elements of a galvanic cell are two materials having a difference in electrical potential with an electrolyte and a conductive path disposed therebetween, prior art conductive sealants serve to produce a large galvanic cell in the immediate area of the weld which is highly conducive to the deterioration of the weld by either pure galvanic action or direct chemical attack.

It is therefore a primary object of the present invention to provide a method whereby resistance welds may be effectively sealed from attack by reactive agents. The process of the present invention permits extremely high quality welds to be consistently produced using a weld-through sealant. In addition, an inexpensive and unusually effective method is provided whereby high quality welds may be consistently produced utilizing a non-conductive weld-through sealant. These and other objects and advantages of this invention will become apparent from the following description thereof.

Briefly, this invention comprises having a liquid film of uncured butyl rubber disposed between the faying surfaces of the base materials at the time of the resistance welding operation. Liquid uncured butyl rubber compounds may be easily applied to the faying surfaces of the base metals and will normally dry out in a period of approximately five minutes. When in its hardened state, butyl rubber cannot be welded through; however, it may be readily re-activated to a liquid form at any subsequent time by the application of an evanescent solvent such as toluene. The use of a butyl rubber compound in a weld-through sealant process has unusual and distinct advantages which will be explained in considerable detail hereinafter.

The process of this invention imposes no restrictions on the materials which may otherwise be welded by conventional resistance welding techniques. Consequently, all materials such as steel, aluminum, aluminum alloys, magnesium, nickel alloys, etc., which have heretofore been joined using conventional resistance welding apparatus and techniques, may be successfully employed in conjunction with the process of this invention.

The first step of the present welding process is to remove the surface film from at least the faying surfaces of the base metals to be welded. These surface films, which form on metals under normal conditions, consist of oxides which act as electrical insulators to adversely affect and in some cases to prevent a weld to be formed between the base metals. In addition, surface films also include impurities which themselves may act as insulators or may become lodged in the weld nugget to deteriorate the quality of the resulting weld. Any conventional metal cleaning technique, such as immersion in an alkaline etch or a mechanical cleaning process, may be employed to remove these surface films.

After the faying surfaces have been cleaned, they are coated with a thin film of a liquid uncured butyl rubber compound. These compounds are commercially available at a reasonable cost and may be procured, for example, as Coating 333C produced by the Coast Pro-Seal and Manufacturing Company of Los Angeles, California. The butyl rubber compound may be painted on the faying surfaces using a brush; however, in large quantity production operations it is more economical to spray them onto the faying surfaces employing a spray gun such as Model No. TGA manufactured by The De Vilbiss Company of Toledo, Ohio. It is necessary that a sufficient amount of the liquid butyl rubber compound be applied such as to completely cover the faying surfaces. While the thickness of the coating is not critical to the success of the process, excellent results are obtained when the thickness of the coatings is on the order of $1/64$ inch. As long as the materials are welded before objectionable surface films have again reformed on the faying surfaces, it is only necessary that one faying surface be coated; however, as a practical matter for reasons which will subsequently become obvious, it is desirable that both faying surfaces be coated.

It has been found that welds cannot be formed through butyl rubber compounds after they have solidified. It has also been found that these butyl rubber compounds are non-conducting in both their liquid and solid forms. While it is not actually known what permits resistance welds to be formed through these compounds while they are in a liquid state and prevents resistance welds to be formed therethrough when they are in their solid state, it is theorized that, when liquid, the pressure exerted on the assembly by the electrodes of the welding apparatus is sufficient to force the compound from between the base metals immediately under the electrodes such that the base metals make direct electrical contact.

The liquid butyl compounds as previously indicated dry out in approximately five minutes. As a practical matter it is often impossible and always inefficient and uneconomical to coat the faying surfaces with the liquid compound, assemble the materials to be welded in the welding apparatus and to weld the individual assemblies before the compounds have hardened. However, it has been found that after these butyl rubber compounds have dried out, they can be readily re-activated at any subsequent time by being wetted with an evanescent solvent to a liquid state that will permit welds to be effected therethrough. Any aromatic solvent such as toluene, xylene, ethyl benzene and styrene or any aliphatic solvent such as aliphatic naphtha may be used to re-activate these compounds after they have once hardened so long as the solvent employed is compatible for use with uncured butyl rubber. Toluene has proved to be extremely economical and useful for this purpose. Only a small amount of these solvents is required to re-activate the hardened butyl rubber coatings and they may be applied by brush or by the use of a spray gun.

The fact that liquid uncured butyl rubber compounds dry in a relatively short period of time and may be readily re-activated has significant advantages in the particular type of process under consideration in that numerous details may be cleaned and protected from the atmosphere for indefinite periods of time prior to being welded and, in addition, it is not necessary to perform the welding operation substantially immediately after applying the weld-through sealant to the faying surfaces of the detail parts. These advantages permit high volume production operations to be performed in an unusually economical and efficient manner.

At any convenient time after applying the liquid butyl rubber compound and the drying out thereof, the hardened butyl rubber coating is re-activated as previously described, the faying surfaces of the metal bodies to be welded are mated and the assembly placed between the electrodes of any conventional resistance welding apparatus. The electrodes of the welding apparatus are then energized while the butyl rubber compound is still in its liquid state to effect a weld between the base metals. Only the normal type of adjustments associated with effecting a weld with the particular welding apparatus employed are necessary. It is not necessary to substantially increase the welding current requirements nor to alter the normal welding operation to produce excellent welds in accordance with the process of this invention.

The resulting weld nugget is completely sealed within a non-conductive butyl rubber elastomer sealant which, being essentially impervious to attack, effectively protects the weld and its associated heat affected zone from highly reactive agents. The weld thus produced is better protected from attack than has heretofore been possible using prior art weld-through sealants.

An equally significant result of producing resistance welds by the process of this invention is that the welds so produced are consistently of much higher quality than those previously resulting from processes utilizing commercially available weld-through sealants. The previously referred to Military Specification MIL-W-6858B defines various classes of welds and establishes stringent test procedures for verifying that welds meet the requirements of any of the classes defined therein. The highest quality weld described in MIL-W-6858B is identified as a class A weld and it has not previously been possible to produce such welds using prior art weld-through sealant techniques. For the first time this invention provides a weld-through sealant technique whereby class A welds may be consistently produced, the welds produced by this process having been fully qualified as class A welds by Government representatives. Consequently, the process of the present invention not only results in a weld which is more effectively sealed from reactive agents than heretofore possible but also results in a higher quality weld than heretofore obtained utilizing a weld-through sealant.

The unusually high quality of the welds produced in accordance with the process described herein is probably best illustrated by the following example:

Six 9 inch x 17 inch x .063 inch sheets were cut from aluminum alloy 2014–T6 bare stock and six 9 inch x 17 inch x .040 inch sheets were cut from aluminum alloy 2024–T3 clad stock. These sheets were then cleaned by being immersed in an aqueous solution of chromic acid and sulfuric acid at a temperature of 150°±10° F. for approximately 15 minutes. This solution comprised 5 oz. by weight of chromic acid and 23 oz. by weight of sulfuric acid to 1 gal. of water. After being rinsed in water and dried, one face of each sheet was immediately painted with a coating of liquid uncured butyl rubber compound produced by Coast Pro-Seal and Manufacturing Company of Los Angeles, California, and identified as Coating 333C. The butyl rubber coatings were permitted to harden and approximately 24 hours later were re-activated by being wetted with a small amount of toluene. Six assemblies were then formed, each consisting of a 2014–T6 bare sheet mated to a 2024–T3 clad sheet with the liquid butyl rubber coatings thereon disposed therebetween. Eighteen resistance welds were produced in each plate before the butyl rubber coatings had again hardened utilizing a resistance welder Model No. PMCO2ST manufactured by The Sciaky Brothers, Incorporated of Chicago, Illinois. Of the resulting welds, one hundred were subjected to tensile shear tests after radiographic examination and five were sectioned and subjected to metallurgical examination. While the minimum allowable tensile shear load for any one test specimen per MIL-W-6858B is 345 p.s.i., the minimum failure load of any of the specimens tested was 670 p.s.i. While the average tensile shear load for all test specimens per MIL-W-6858B is 435 p.s.i., the average tensile shear load failure for all specimens tested was 763 p.s.i. The radiographic and metallurgical examination otherwise qualified the resulting welds as fully meeting the class A requirements of MIL-W-6858B.

The process employed by the applicants in this example for initially cleaning the aluminum sheets prior to their being coated with the liquid uncured butyl rubber compound is substantially described on pages 616–617 of Metals Handbook, 8th edition, volume 2, published by American Society for Metals. This publication also describes equivalent processes which may alternately be employed to accomplish the same result.

This invention may be performed in other ways without departing from the spirit or essential character thereof. The process of the invention described herein is therefore to be considered as in all respects illustrative and not restrictive, the scope of the invention being indicated by the appended claims and all changes which come within the meaning and range of equivalency of the claims are intended to be embraced therein.

The invention claimed is:

1. In a process for producing a high quality resistance weld between metal plates, said weld being effectively sealed from attack by highly reactive agents, the improvement including the steps of:
   (a) mating said metal plates for resistance welding with a liquid film of uncured butyl rubber disposed between deoxidized faying surfaces thereof; and
   (b) resistance welding said metal plates together through said liquid film.

2. The process of claim 1 wherein said plates are formed of metals selected from a group consisting of aluminum and aluminum alloys.

3. A process for producing a high quality resistance weld between metal plates, said weld being effectively sealed from attack by highly reactive agents comprising the steps of:
   (a) removing surface film from the faying surfaces of said metal plates;
   (b) mating said metal plates for resistance welding with a liquid film of uncured butyl rubber disposed between said faying surfaces; and
   (c) resistance welding said metal plates together through said liquid film.

4. A process for producing a high quality resistance weld between metal plates, said weld being effectively sealed from attack by highly reactive agents comprising the steps of:
   (a) removing surface film from the faying surfaces of said metal plates;
   (b) applying a liquid coating of uncured butyl rubber to at least one of said faying surfaces;
   (c) permitting said liquid coating to dry;
   (d) reactivating said coating to a liquid state by wetting said coating with an evanescent solvent;
   (e) mating said metal plates for resistance welding, said liquid coating of uncured butyl rubber being disposed between their respective said faying surfaces; and
   (f) resistance welding said metal plates together through said liquid coating.

5. The process of claim 4 wherein said evanescent solvent is toluene.

6. The process of claim 4 wherein said evanescent solvent is selected from a group consisting of toluene, xylene, ethyl benzene, styrene and aliphatic naptha.

7. The process of claim 4 wherein said metal plates are formed of metals selected from a group consisting of aluminum and aluminum alloys.

References Cited by the Examiner

UNITED STATES PATENTS

| | | |
|---|---|---|
| 2,124,235 | 7/38 | Mueller-Conradi et al. |
| 2,311,004 | 2/43 | Thomas et al. |
| 2,423,755 | 7/47 | Calfee et al. |
| 2,452,805 | 11/48 | Sussenbach _____ 219—92 X |
| 2,510,727 | 6/50 | Sussenbach _____ 219—91 X |
| 3,033,734 | 5/62 | Price _____ 156—305 |
| 3,117,045 | 1/64 | Schwickert _____ 156—305 X |

FOREIGN PATENTS 825,910   3/38   France.

JOHN F. CAMPBELL, *Primary Examiner.*